United States Patent
Sjungargard et al.

(10) Patent No.: US 9,517,836 B2
(45) Date of Patent: Dec. 13, 2016

(54) METHOD OF OPERATING AN AIRCRAFT FUEL MANAGEMENT SYSTEM

(75) Inventors: Petter Sjungargard, Bristol (GB); Ian Case, Bristol (GB); Antoine Burckhart, Bristol (GB); Michael Spottiswoode, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1146 days.

(21) Appl. No.: 13/130,901

(22) PCT Filed: Nov. 25, 2008

(86) PCT No.: PCT/GB2008/051109
§ 371 (c)(1),
(2), (4) Date: May 24, 2011

(87) PCT Pub. No.: WO2010/061155
PCT Pub. Date: Jun. 3, 2010

(65) Prior Publication Data
US 2011/0231056 A1    Sep. 22, 2011

(51) Int. Cl.
*B64D 37/14* (2006.01)
*B64C 17/10* (2006.01)
(Continued)

(52) U.S. Cl.
CPC ............... *B64C 17/10* (2013.01); *B64D 37/00* (2013.01); *B64D 37/14* (2013.01); *G01C 5/005* (2013.01);
(Continued)

(58) Field of Classification Search
CPC ....... B64D 37/14; G05D 1/0816; G01C 5/005; G01C 23/00
(Continued)

(56) References Cited

U.S. PATENT DOCUMENTS 3,818,760 A    6/1974  Howard et al.
3,830,090 A *  8/1974  Hersch et al. .............. 73/304 C
(Continued)

FOREIGN PATENT DOCUMENTS

DE    3825630 A    2/1990
EP    1139077 A    10/2001
(Continued)

OTHER PUBLICATIONS

Office Action issued by the Russian Patent Office in corresponding Russian Application No. 2011-123152, filed Nov. 25, 2008, with English Translation.
(Continued)

*Primary Examiner* — Muhammad Shafi
*Assistant Examiner* — Majdi Alsomiri
(74) *Attorney, Agent, or Firm* — Hauptman Ham, LLP

(57) ABSTRACT

A method of operating an aircraft fuel management system for an aircraft having at least one fuel tank, each fuel tank having an associated fuel quantity indicator arranged to provide an indication of the amount of fuel in the associated fuel tank, the method comprising calculating a value for the amount of fuel on board (FOB_FailedFQI) the aircraft to be utilized by the fuel management system in the event of a failure of at least one of the fuel quantity indicators, the amount of fuel on board being calculated as a value for the initial amount of fuel on board (FOBinit) minus the amount of fuel used. Additionally or alternatively a value for the gross weight center of gravity of the aircraft is calculated using an assigned value of fuel for each of the fuel tanks having an associated failed fuel quantity indicator.

17 Claims, 2 Drawing Sheets

(51) Int. Cl.
*G05D 1/08* (2006.01)
*G01C 5/00* (2006.01)
*G01C 23/00* (2006.01)
*B64D 37/00* (2006.01)
*G01F 23/00* (2006.01)

(52) U.S. Cl.
CPC .......... *G01C 23/00* (2013.01); *G01F 23/0076* (2013.01); *G05D 1/0816* (2013.01)

(58) Field of Classification Search
USPC .......... 701/36, 8, 9, 14; 73/1.73, 65, 113.01, 73/114.08–114.17, 114.38–114.43, 114.54, 73/118.03, 304; 364/442, 450, 463, 466, 364/567, 623
See application file for complete search history.

(56) References Cited

U.S. PATENT DOCUMENTS

| | | | |
|---|---|---|---|
| 4,420,976 A | | 12/1983 | Orloff et al. |
| 4,441,157 A | * | 4/1984 | Gerchman et al. ............. 702/52 |
| 4,494,210 A | * | 1/1985 | Miller ............................ 702/175 |
| 4,622,639 A | | 11/1986 | Adelson et al. |
| 6,332,358 B1 | * | 12/2001 | Atkinson ..................... 73/304 R |
| 6,336,362 B1 | * | 1/2002 | Duenas ........................... 73/313 |
| 6,397,668 B1 | | 6/2002 | Davison et al. |
| 6,597,998 B1 | * | 7/2003 | Gonring .......................... 702/55 |
| 7,330,551 B2 | * | 2/2008 | Park ............................... 381/11 |
| 7,675,405 B2 | * | 3/2010 | Rumpf ....................... 340/450.2 |
| 2003/0136173 A1 | | 7/2003 | Elenich et al. |

FOREIGN PATENT DOCUMENTS

| | | |
|---|---|---|
| GB | 2190501 A | 11/1987 |
| JP | 601073 A | 1/1985 |
| RU | 2234685 C2 | 1/2013 |
| WO | 2008-048267 A1 | 4/2008 |

OTHER PUBLICATIONS

Notification of Reasons for Refusual for Patent Application No. 2011/536940 on Jun. 4, 2013 (Drafted May 30, 2013) English Translation.

International Search Report and the Written Opinion for PCT/GB2008/051109 mailed Nov. 2, 2009.

* cited by examiner

METHOD OF OPERATING AN AIRCRAFT FUEL MANAGEMENT SYSTEM

RELATED APPLICATIONS

The present application is a National Phase of International Application Number PCT/GB2008/051109, filed Nov. 25, 2008.

FIELD OF THE INVENTION

The present invention relates to a method for operating an aircraft fuel management system in the event of a failure of a fuel quantity indicator associated with one or more of the fuel tanks of the aircraft fuel system.

BACKGROUND TO THE INVENTION

Modern large aircraft typically have a number of separate fuel tanks, the quantity of fuel in each tank being monitored and controlled in flight by a computerised fuel management system. Before an aircraft can be allowed to depart from an airport the pilot of the aircraft must be confident that the quantity of fuel on board the aircraft is sufficient to reach the intended destination. Ordinarily the information required concerning the quantity of fuel on board the aircraft to satisfy this requirement is provided by the fuel management system, based on fuel quantity readings from each of the individual fuel tanks. During flight the fuel quantity readings from each of the individual tanks are used, with other parameters, to calculate the gross weight centre of gravity of the aircraft at any given time and to perform automatic transfers of fuel between the individual fuel tanks to maintain the centre of gravity within desired limits. In accordance with known procedures, in the event of a failure within the fuel management system resulting in the quantity fuel within one of the individual fuel tanks becoming unknown, either whilst the aircraft is on the ground or during flight, the automatic control of a transfer of fuel between the individual fuel tanks by the fuel management system ceases since a total value for the amount of fuel on board the aircraft is no longer to the fuel management system. However, a dispatch of the aircraft or the continued flight of the aircraft is permitted provided that the aircraft crew perform manual fuel transfers based on manually performed calculations of the amount of fuel on board at a given time. This has the disadvantage of increasing the crew workload and, since the fuel calculations and transfers are subject to human error, decreasing the aircraft safety. It would therefore be advantageous to provide an alternative fuel management system and method of operation thereof that addresses these disadvantages.

SUMMARY OF THE INVENTION

According to a first aspect of the present invention there is provided a method of operating an aircraft fuel management system for an aircraft having at least one fuel tank, each fuel tank having an associated fuel quantity indicator arranged to provide an indication of the amount of fuel in the associated fuel tank, the method comprising calculating a value for the amount of fuel on board (FOB_FailedFQI) the aircraft to be utilised by the fuel management system in the event of a failure of at least one of the fuel quantity indicators, the amount of fuel on board being calculated as a value for the initial amount of fuel on board (FOBinit) minus the amount of fuel used.

In addition the method may further comprise calculating a value for the aircraft gross weight (GW) equal to the sum of the calculated value for the amount of fuel on board (FOB_FailedFQI) and a predetermined value for the weight of the aircraft with zero fuel on board.

The value for the initial amount of fuel on board (FOBinit) is preferably determined at the time when all the aircraft engines have started as the sum of the amount of fuel in each fuel tank provided by each associated fuel quantity indicator.

Alternatively, the value for the initial amount of fuel on board (FOBinit) may be determined at the time when all the aircraft engines are running as the sum of an assigned value of fuel for each fuel tank having an associated failed fuel quantity indicator plus the sum of fuel in each of the remaining fuel tanks provided by each associated fuel quantity indicator.

Furthermore, the value for the initial amount of fuel on board (FOBinit) may be determined as the sum of values for the amount of fuel in each fuel tank, whereby the values are manually entered.

Any one of the methods of determining FOBinit may be used in combination for more than one fuel tank.

The assigned value of fuel in at least one of the tanks with an associated failed fuel quantity indicator is preferably in the range of zero to the maximum capacity of the tank. The assigned value may be automatically set equal to the amount of fuel in another fuel tank in the system that has a working fuel quantity indicator. Alternatively, the assigned value may be manually entered.

According to a further aspect of the present invention there is provided a method of operating an aircraft fuel management system for an aircraft having at least one fuel tank, each fuel tank having an associated fuel quantity indicator arranged to provide an indication of the amount of fuel in the associated fuel tank, the method comprising calculating a value for the gross weight centre of gravity of the aircraft to be utilised by the fuel management system in the event of a failure of at least one of the fuel quantity indicators, the calculation using an assigned value of fuel in each fuel tank having an associated failed fuel quantity indicator.

The assigned value may be in the range of zero to the maximum capacity of the tank. the assigned value may be automatically set equal to the amount of fuel in another fuel tank in the system that has a working fuel quantity indicator. Alternatively, the assigned value may be set equal to an initial amount of fuel on board determined according to the method of the first aspect of the present invention minus the sum of the values of the fuel quantity indicators for each remaining fuel tanks. Furthermore, the assigned value may be manually entered.

According to either aspect of the present invention the transfer of fuel from any one of the aircraft fuel tanks may be automatically controlled in dependence of the calculated values. If the aircraft has a plurality of fuel tanks, a tank associated with a failed fuel quantity indicator may be automatically declared empty at the same time as another tank is declared empty, where both tanks ordinarily contain substantially the same amount of fuel. Alternatively, the tank may be declared empty when a fuel pressure signal from a pump located within the tank is below a threshold value for longer than a predetermined period of time.

BRIEF DESCRIPTION OF THE DRAWINGS

Embodiments of the present invention will now be described below, by way of non-limiting example only, with reference to the accompanying figures, of which.

DESCRIPTION OF EMBODIMENTS OF THE INVENTION

Figure 1:
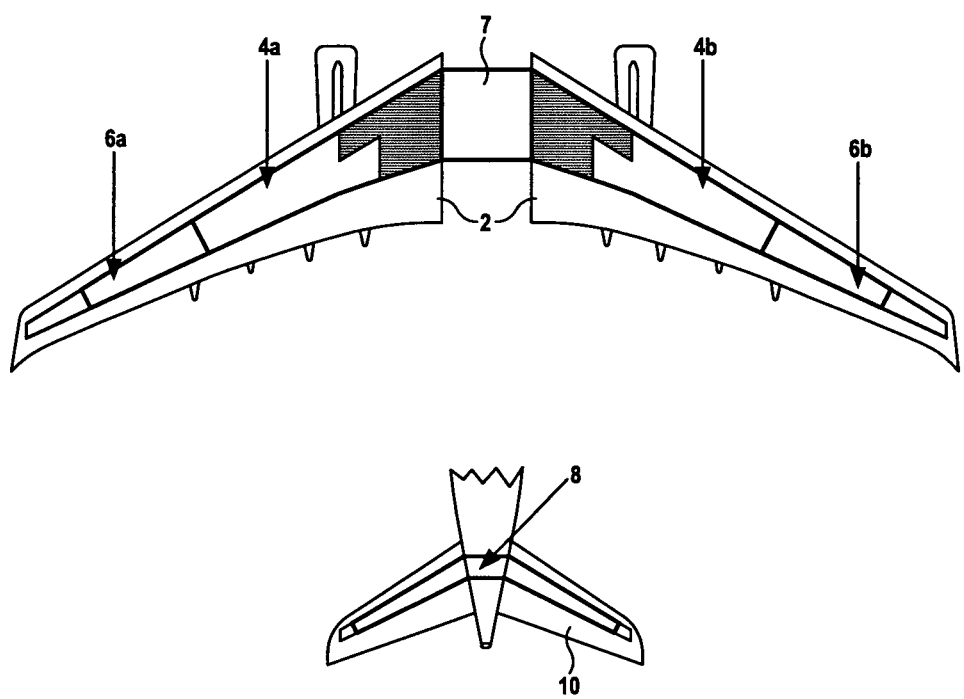
FIG. 1 schematically illustrates the possible fuel tank layout within an aircraft.

A typical arrangement of the individual fuel tanks within an aircraft fuel system is schematically illustrated in FIG. 1, with only those parts of the aircraft containing the fuel tanks, i.e. the wings and tail section, being illustrated for clarity. Located within the wings 2 of the aircraft are two pairs of fuel tanks (four individual tanks in total), an inner pair 4a, 4b and an outer pair 6a, 6b. Typically, the majority of the fuel carried by the aircraft is held within these tanks. A single central tank 7 is located within the fuselage of the aircraft between the wings. An additional single tank 8 is located in the tail section of the aircraft, and more particularly in the horizontal stabilisers 10. This fuel tank is typically referred to as the trim tank, since by varying the amount of fuel held within this tank the centre of gravity of the aircraft can be controlled, or trimmed. It will be appreciated that the illustrated fuel tank arrangement is shown purely as an example and other arrangements are possible. For example, some aircraft do not have a trim tank, whilst others may have additional tanks located within the cargo bay of the aircraft.

Associated with each individual fuel tank is a corresponding fuel quantity indicator (FQI) that provides a reported value for the amount of fuel within each tank, this value generally being given in kilograms. In practice, readings from a number of individual fuel sensors will be taken for each fuel tank, together with information concerning the attitude of the aircraft and further information relating to the shape of the fuel tank, which when combined by an appropriate data processor provides a single value for the reported amount of fuel contained within the fuel tank. However, for the purposes of clarity and ease of understanding, the FQI for each fuel tank can be considered as a single unit. The values reported by each FQI for all of the individual fuel tanks are ordinarily reported to the flight crew by means of an appropriate display in the aircraft cockpit, as well as being provided to other parts of the aircraft control systems, including the fuel management system. Examples of further parameters that are calculated using the fuel values reported by the fuel quantity indicators include values for the fuel on board (FOB), gross weight (GW) of the aircraft, and the gross weight centre of gravity (GWCG) of the aircraft in flight. These values are in turn used by the fuel management system to automatically transfer fuel between the individual fuel tanks, for example, to maintain the GWCG within particular limits.

In the event of a failure of one of the FQIs for a single fuel tank such that a value for the amount of fuel held within that tank was unavailable, in systems according to the prior art corresponding values of FOB, GW and GWCG would correspondingly be unavailable and therefore the automatic transfer of fuel between fuel tanks by the fuel management system based on these values would not be possible.

Figure 2:
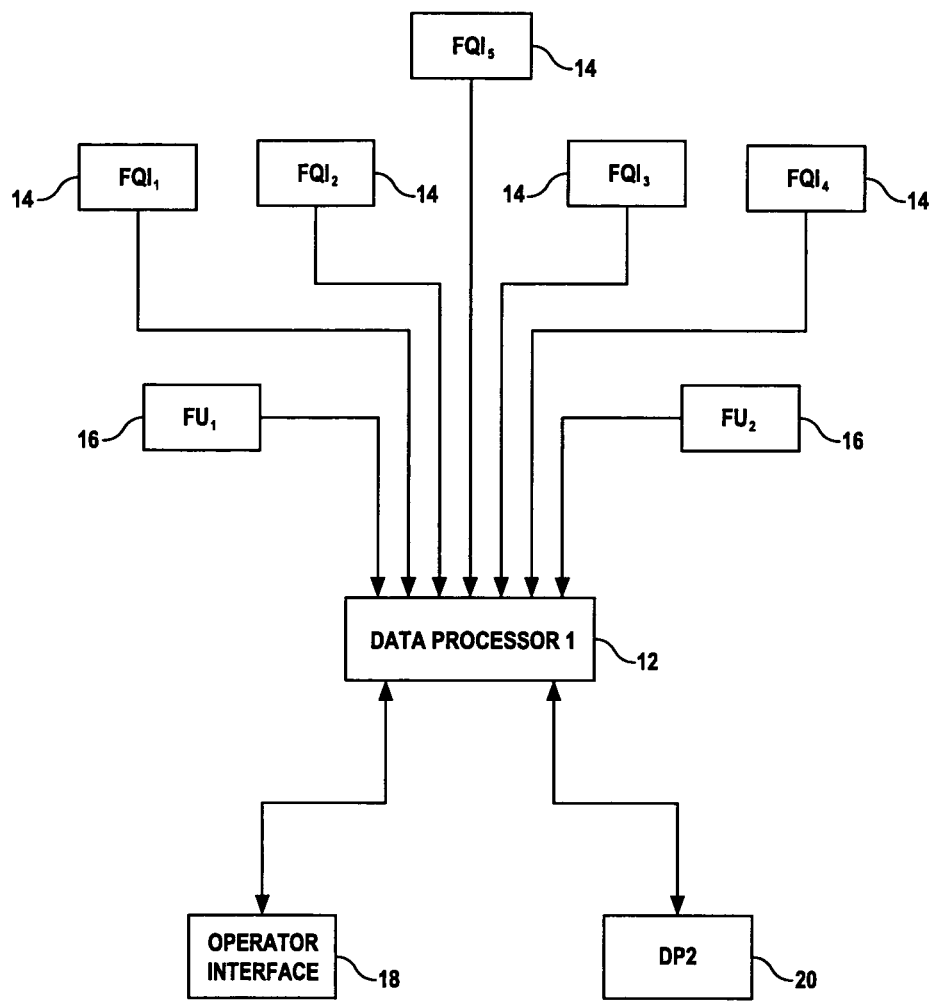
FIG. 2 schematically illustrates the fuel management system associated with the fuel tank layout of FIG. 1.

A fuel management system according to an embodiment of the present invention is schematically illustrated into FIG. 2. A first data processor 12 is provided that receives data inputs from each of the fuel quantity indicators 14 associated with each individual fuel tank. Additionally, the first data processor 12 also receives data input from fuel used indicators (FU) that provide an indication of the amount of fuel used by each engine of the aircraft. There is a fuel used indicator 16 associated with each engine, which in the example illustrated in FIGS. 1 and 2 number two in total. The first data processor 12 is typically connected to an operator interface 18, which may for example be a touch screen located in the aircraft cockpit, provided to output information concerning the aircraft fuel system to the flight crew or other maintenance personnel and to also allow data input to be provided to the first data processor 12 via the operator interface 18. The first data processor 12 will also typically be in bi-directional communication with one or more further data processors 20 associated with other control systems of the aircraft. If all of the fuel quantity indicators 14 associated with each of the individual fuel tanks are operating normally then they will provide data to the first data processor 12 indicative of the amount of fuel in each of the individual fuel tanks. The amount of fuel in each tank is summed by the first data processor to provide a value for the fuel on board the aircraft, FOB. The value of FOB is used to calculate one or more fuel system parameters, such as the gross weight of the aircraft, GW. This data is then used by the first data processor, either separately or in conjunction with one or more of the other data processors 20 in the aircraft control system, to determine and control any desired fuel transfers. Information concerning the quantity of fuel and fuel usage will also be provided by the first data processor to the operator interface 18, and therefore to the aircraft crew.

In the event of a failure of one or more of the FQIs, the failure occurring either before the aircraft is dispatched for take-off or during flight, the normal value of fuel on board is no longer available. According to embodiments of the present invention in these circumstances the fuel management system replaces the normal value for FOB with a calculated value; termed FOB_FailedFQI. The calculation of FOB_FailedFQI is performed as follows:

$$FOB\_FailedFQI = FOBinit - Fuel\_Used$$

Fuel_Used is the value of fuel used by the aircraft's engines from the point at which all the aircraft's engines were started and fully running and is determined from the sum of the values provided by the fuel used indicators 16 associated with each aircraft engine.

FOBinit is a value for the initial amount of fuel on board at the point at which all the aircraft's engines are fully running prior to dispatch of the aircraft, i.e. the same point in time from which Fuel_Used is recorded. If all of the FQIs for the aircraft are functioning at the point of dispatch of the aircraft then the value of FOBinit is given as the sum of the fuel quantity values reported by each FQI. A value for FOB_FailedFQI is then continuously calculated by the data processor 12 of the fuel management system during the aircraft flight in case of a subsequent FQI failure, in which case the calculated value for FOB_FailedFQI replaces the normal value of FOB.

If an FQI failure occurs before the aircraft is dispatched then a value for FOBinit is determined in an alternative way. According to some embodiments the value for FOBinit is determined as the sum of values reported by the working FQIs plus an assigned value for the amount of fuel in the fuel tank associated with the failed FQI. The assigned value may simply be a value manually entered by the aircraft crew (entered via the operator interface 18) based on their knowledge of the expected quantity of fuel in the failed FQI tank. Alternatively, the assigned value may be automatically determined depending on the location of the fuel tank associated with the failed FQI. For example, if the fuel tank associated with the failed FQI is one of the wing tanks (4a, 6a) then the assigned value is set to be equal to the reported FQI value for the corresponding sister tank (4b, 6b) located in the opposite wing. If the fuel tank associated with the failed FQI is the trim tank then the assigned value is set to zero. Where more than one FQI failure occurs then an assigned value for each of the associated tanks is determined according to any of the above described methods e.g. more than one method of determining respective assigned value can be done simultaneously.

A further alternative method of determining a value for FOBinit is to manually enter an estimated value for each fuel tank (irrespective of whether their associated FQI has failed or not) and sum all the estimated values.

In embodiments of the present invention further aircraft parameters in addition to FOB_FailedFQI may be derived. For example, a value for the gross weight of the aircraft in the event of an FQI failure, termed GW_FailedFQI can be derived as:

GW_FailedFQI=FOB_FailedFQI+ZFW where ZFW is a predetermined value for the weight of the aircraft with zero fuel on board and is typically manually entered into the fuel management system by the aircraft crew.

A further aircraft parameter that is calculated in embodiments of the present invention is gross weight centre of gravity, GWCG, of the aircraft along the length of the aircraft. Under normal conditions, i.e. all FQIs operational, the GWCG is calculated by the fuel management system using the mass of fuel in each fuel tank in conjunction with other known properties of fuel tank itself, such as centroid distance. Such methods of calculating the GWCG using the mass of fuel in each tank are known by skilled persons. In the event of an FQI failure the GWCG is calculated according to embodiments of the present invention by assigning a value for the mass of fuel in the fuel tank associated with each failed FQI. The value may be assigned automatically depending on the location of the relevant fuel tank in an analogous manner to that described above in relation to determining FOBinit. For example, if the FQI failure is in respect of a wing tank then the mass of fuel for that wing tank is assigned to be equal to the mass of fuel in the corresponding tank in the other wing, whilst an FQI failure in respect of the trim tank causes the value for the mass of fuel in the trim tank to be set to zero. Alternatively, the value may be assigned by subtracting the values for the amount of fuel in each of the fuel tanks with working fuel quantity indicators from the value for the initial amount of fuel on board, FOBinit. In a further embodiment the assigned values may be manually entered by the crew. Having assigned a value for the mass of fuel in each of the fuel tanks associated with a failed FQI the GWCG is calculated in accordance with the known methods.

The parameter values calculated according to embodiments of the present invention may subsequently be used by the fuel management system to control any desired transfers of fuel between fuel tanks in the event of one or more FQI failures. For example, the fuel management system may be arranged such that whilst automatic fuel transfers may be performed using the calculated values of FOB_FailedFQ$_1$, GW_FailedFQI or GWCG_FailedFQI for example, an automatic transfer of fuel into a fuel tank with an associated FQI that has failed is not permitted. Where such an automatic transfer into a fuel tank is prohibited the fuel management system may inform the aircraft crew (via the operator interface) and request that the crew perform a manual transfer of fuel into the fuel tank in question. Furthermore, a tank associated with a failed FQI may be declared empty by the fuel management system on the basis of the status of a reported FQI value from another fuel tank, such as a corresponding wing tank. Alternatively, the tank may be declared empty when the fuel pressure reading from any one of the fuel pumps located in the tank is below a threshold value for more than a predetermined period of time, thus indicating that the tank has effectively been pumped empty.

By operating the fuel management system in accordance with embodiments of the present invention one or more aircraft parameters can be automatically calculated and subsequent fuel transfers operated automatically by the fuel management system. This has the twin benefits of decreasing the workload of the flight crew in the event of a FQI failure and improving the safety of the aircraft in such conditions by removing the possibility of human error in performing manual fuel transfers.

The invention claimed is:

1. A method, comprising:
automatically managing fuel, in an aircraft including an automatic aircraft fuel management system, the aircraft having at least one fuel tank, each fuel tank having an associated fuel quantity indicator arranged to provide an indication of the amount of fuel in the associated fuel tank, the method including:
experiencing a failure of at least one of the fuel quantity indicators during a first temporal period such that at least one of the fuel quantity indicators no longer works;
during the first temporal period, automatically calculating, by a processor, a value for the amount of fuel on board (FOB_FailedFQI) the aircraft to be utilised by the fuel management system, the amount of fuel on board being calculated as a value for the initial amount of fuel on board (FOBinit) minus the amount of fuel used; and
flying the aircraft in the air during the first temporal period while experiencing the failure of the at least one of the fuel quantity indicators, wherein the action of flying the aircraft in the air occurs at least one of during or after the action of automatically calculating, by a processor, the value for the amount of fuel on board the aircraft, wherein
the value for the initial amount of fuel on board (FOBinit) is determined at the time when all the aircraft engines are running as the sum of an assigned value of fuel for each fuel tank having an associated failed fuel quantity indicator plus the sum of fuel in each of the remaining fuel tanks provided by each associated fuel quantity indicator, wherein the assigned value is manually entered.

2. The method of claim 1, further comprising:
indicating respective fuel tank quantities by the respective fuel quantity indicator(s) during a second temporal period with working respective fuel quantity indicator(s), wherein the second temporal period occurs before the first temporal period.

3. The method of claim 1, further comprising:
indicating respective fuel tank quantities by the respective fuel quantity indicator(s) during a second temporal period with working respective fuel quantity indicator(s), wherein the second temporal period occurs before the first temporal period and occurs before the action of flying the aircraft, wherein
the action of experiencing a failure of at least one of the fuel quantity indicators during the first temporal period such that at least one of the fuel quantity indicators no longer works begins before flying the aircraft.

4. A method, comprising:
operating an aircraft during a first temporal period, the aircraft including an aircraft fuel management system, the aircraft having at least one fuel tank and at least one engine;
during operation of the aircraft during the first temporal period, automatically indicating with respective fuel quantity indicators respective amounts of fuel in respective fuel tanks of the aircraft;
during a second temporal period subsequent to the first temporal period, during which at least one of the fuel quantity indicators has failed, automatically operating the aircraft fuel management system by:
calculating, by a processor, a value for the amount of fuel on board (FOB_FailedFQI) the aircraft to be utilised by the fuel management system, the amount of fuel on board being calculated as a value for the initial amount of fuel on board (FOBinit) minus the amount of fuel used, wherein the value for the initial amount of fuel on board (FOBinit) is automatically determined at the time when all the aircraft engines are running as the sum of an assigned value of fuel for each fuel tank having an associated failed fuel quantity indicator plus the sum of fuel in each of the remaining fuel tanks provided by each associated fuel quantity indicator, wherein the assigned value is automatically set to zero.

5. A method according to claim 4, wherein the fuel tank having the associated failed fuel quantity indicator is a trim tank.

6. A method according to claim 4, further comprising operating the aircraft during the second temporal period while the at least one of the fuel quantity indicators has failed.

7. A method according to claim 4, further comprising operating the aircraft during the second temporal period while the at least one of the fuel quantity indicators has failed such that all the engines are running and wherein the value for the initial amount of fuel on board (FOBinit) is automatically determined during operation of the aircraft during the second temporal period.

8. A method, comprising;
operating an air vehicle, wherein the air vehicle includes at least one engine, the action of operating the air vehicle including running all engines of the aircraft; and
executing the following method while operating the air vehicle with all engines running:
automatically operating an air vehicle fuel management system of the air vehicle, wherein the air vehicle has at least one fuel tank, each fuel tank having an associated fuel quantity indicator arranged to provide an indication of the amount of fuel in the associated fuel tank, the method comprising calculating, by a processor, a value for the amount of fuel on board (FOB_FailedFQI) the air vehicle to be utilised by the fuel management system in the event of a failure of at least one of the fuel quantity indicators, the amount of fuel on board being calculated as a value for the initial amount of fuel on board (FOBinit) minus the amount of fuel used, wherein the value for the initial amount of fuel on board (FOBinit) is determined at the time when all the air vehicle engines are running as the sum of an assigned value of fuel for each fuel tank having an associated failed fuel quantity indicator plus the sum of fuel in each of the remaining fuel tanks provided by each associated fuel quantity indicator, wherein the assigned value is automatically set equal to the amount of fuel in another fuel tank in the system that has a working fuel quantity indicator.

9. A method, comprising;
operating an air vehicle, wherein the air vehicle includes at least one engine, the action of operating the air vehicle including running all engines of the aircraft; and
executing the following method while operating the air vehicle with all engines running:
operating an air vehicle fuel management system of the air vehicle, wherein the air vehicle has at least one fuel tank, each fuel tank having an associated fuel quantity indicator arranged to provide an indication of the amount of fuel in the associated fuel tank, the method comprising calculating, by a processor, a value for the gross weight centre of gravity of the air vehicle to be utilised by the fuel management system in the event of a failure of at least one of the fuel quantity indicators, the calculation using an assigned value of fuel in each fuel tank having an associated failed fuel quantity indicator, wherein the assigned value is automatically set equal to the amount of fuel in another fuel tank in the system that has a working fuel quantity indicator.

10. A method of automatically operating an aircraft fuel management system for an aircraft having at least one fuel tank, each fuel tank having an associated fuel quantity indicator arranged to provide an indication of the amount of fuel in the associated fuel tank, the method comprising calculating, by a processor, a value for the amount of fuel on board (FOB_FailedFQI) the aircraft to be utilised by the fuel management system in the event of a failure of at least one of the fuel quantity indicators, the amount of fuel on board being calculated as a value for the initial amount of fuel on board (FOBinit) minus the amount of fuel used, wherein the value for the initial amount of fuel on board (FOBinit) is determined at the time when all the aircraft engines are running as the sum of an assigned value of fuel for each fuel tank having an associated failed fuel quantity indicator plus the sum of fuel in each of the remaining fuel tanks provided by each associated fuel quantity indicator, wherein the assigned value is automatically set equal to the amount of fuel in another fuel tank in the system that has a working fuel quantity indicator, wherein the method further comprises:
operating the aircraft during a first temporal period in which the respective amounts of fuel in respective fuel tanks are indicated by respective fuel quantity indicators; and
operating the aircraft during a second temporal period subsequent to the first temporal period, during which at least one of the fuel quantity indicators has failed, wherein
the action of calculating a value for the amount of fuel on board and the action of determining the value for the initial amount of fuel on board occur during the second temporal period during which at least one of the fuel quantity indicators has failed.

11. The method of claim 10, wherein the method further comprises calculating a value for the aircraft gross weight (GW) equal to the sum of the calculated value for the amount of fuel on board (FOB_FailedFQI) and a predetermined value for the weight of the aircraft with zero fuel on board.

12. The method of claim 10, wherein the assigned value of fuel in at least one of the tanks with an associated failed fuel quantity indicator is in the range of zero to the maximum capacity of the tank.

13. The method of claim 10, further comprising automatically controlling transfer of fuel from any one of the aircraft fuel tanks in dependence of the calculated values.

14. The method of claim 10, wherein the aircraft has a plurality of fuel tanks and a tank associated with a failed fuel quantity indicator is automatically declared empty at the same time as another tank is declared empty, where both tanks ordinarily contain substantially the same amount of fuel.

15. The method of claim 10, wherein a tank associated with a failed fuel quantity indicator is declared empty when a fuel pressure signal from a pump located within the tank is below a threshold value for longer than a predetermined period of time.

16. The method of claim 10, wherein the fuel tank having the associated failed fuel quantity indicator is a wing tank, and wherein the assigned value is automatically set equal to the amount of fuel in the corresponding tank in the other wing.

17. A method of automatically operating an aircraft fuel management system for an aircraft having at least one fuel tank, each fuel tank having an associated fuel quantity indicator arranged to provide an indication of the amount of fuel in the associated fuel tank, the method comprising calculating, by a processor, a value for the gross weight centre of gravity of the aircraft to be utilised by the fuel management system in the event of a failure of at least one of the fuel quantity indicators, the calculation using an assigned value of fuel in each fuel tank having an associated failed fuel quantity indicator, wherein the assigned value is automatically set equal to the amount of fuel in another fuel tank in the system that has a working fuel quantity indicator, wherein the method further comprises:

operating the aircraft during a first temporal period in which the respective amounts of fuel in respective fuel tanks are indicated by respective fuel quantity indicators; and operating the aircraft during a second temporal period subsequent to the first temporal period, during which at least one of the fuel quantity indicators has failed, wherein the action of calculating a value for the amount of fuel on board and the action of determining the value for the initial amount of fuel on board occur during the second temporal period during which at least one of the fuel quantity indicators has failed.

* * * * *